Dec. 8, 1964   F. SCHMITZ   3,160,389
SLIDE VALVE WITH A VALVE ELEMENT COVERED BY A DIAPHRAGM
Filed Sept. 6, 1961   2 Sheets-Sheet 2

INVENTOR
FRIEDRICH SCHMITZ
BY
Lowry & Rinehart
ATTYS.

United States Patent Office 3,160,389
Patented Dec. 8, 1964

3,160,389
SLIDE VALVE WITH A VALVE ELEMENT
COVERED BY A DIAPHRAGM
Friedrich Schmitz, Cologne-Sulz, Germany, assignor to Hochdruck-Dichtungs-Fabrik Schmitz & Schulte, Dusseldorf, Germany
Filed Sept. 6, 1961, Ser. No. 136,235
1 Claim. (Cl. 251—327)

The invention relates to a slide valve with a valve element which in cross-section transverse to the stroke is shorter in the one direction as, for instance, in the direction of passage than in the transverse direction and which is covered by a diaphragm whose edge is fixed into the casing.

There are known slide valves in which the valve element consisting of an elastic material has parallel side surfaces. In these gate valves, sealing is effected by tight sliding of the parallel side surfaces of the valve element at the corresponding parallel walls of the valve seat.

In such known slide valves the valve is in frictional engagement with the walls of the valve and throughout its full range of movement, and considerable force is therefore necessary to effect closure of the valve. Simlarly the valve is subjected to a high degree of wear. Sealing is effected by compression and distortion of the valve element. To increase the distortion soft rubber layers have hitherto been embedded in the valve element. In such a sealing effect based exclusively on distortion by compression the material may not return completely to its initial form when the pressure is relieved, thus increasing frictional contact with the walls of the valve seat and hence increasing wear on the valve. In a water cock without diaphragm, sealing of the valve element is effected by direct contact with a surface perpendicular to the axis of the spindle. This contact has to be made with great accuracy so that a perfect seal may be obtained within the valve seat and above the same. In practical use, efficient sealing will however be obtainable only by a powerful contact pressure.

The invention has for its object a further development of a slide valve with a valve element covered by a diaphragm. A very important feature of the invention is the provision of a valve element having a constricted neck below which is a broad wedge-shaped member terminating at its lower end in a valve closure member having two substantially parallel sides, the ends converging downwardly and being outwardly convexed to afford linear contact with the conforming walls of the valve seat. The valve seat is also tapered to conform to the configuration of the wedge-shaped upper portion of the valve member, so that the only flat sealing surfaces are sharply tapered in the direction of closing movement of the valve, precluding any sliding contact and reducing wear. The bottom edge of the valve is also outwardly convexed to provide linear contact at the bottom of the valve seat.

By this formation is obtained a valve element which satisfies the contradictory requests for a wide-angled sealing surface with a small upper gap in the valve seat. The truncated pyramid-shape of the valve element with a large broadside is restricted to a part above the passage while the lower closing member moved into the passage is narrow and provided with parallel surfaces turned towards the passage. By the wide-angled part of the valve-seat shaped like a truncated pyramid is obtained the possibility of satisfactory sealing without the aid of the diaphragm itself or of the junction point of the diaphragm with the valve element. The adjacent lower closing member of the valve element may be formed narrow so that the upper opening of the valve seat may be small and is for the most part kept closed by the bottom surface of the closing member as is known in slide valves with a valve element having parallel side surfaces. No excessive force is necessary for closing of the slide valve. The elastic diaphragm covering the valve element is conserved and no friction is produced during the reciprocating movement of the valve element.

In the drawing I illustrate by way of example one embodiment of the object of the invention.

Figure 1:
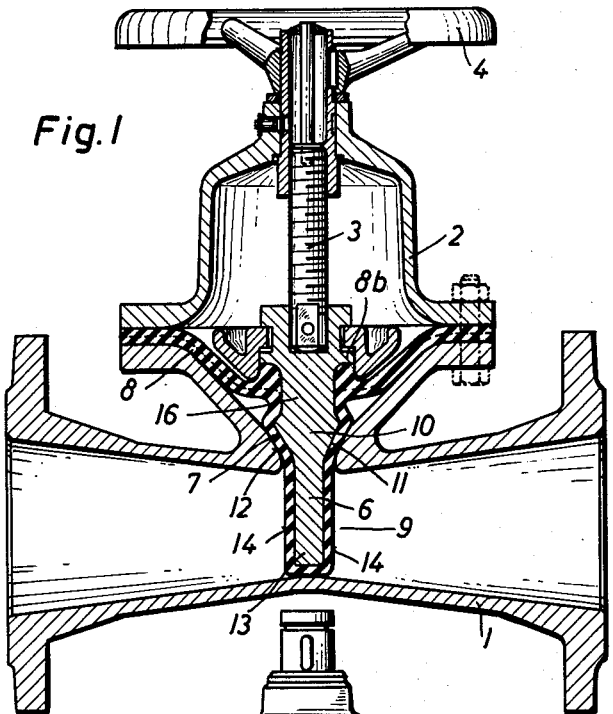
FIG. 1 shows a longitudinal cross-section of the slide valve according to the invention.
Figure 2:
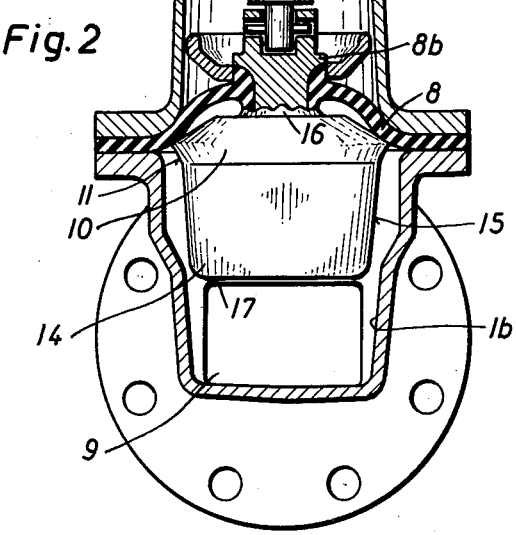
FIG. 2 is a transversal cross-section of FIG. 1.
Figure 3:
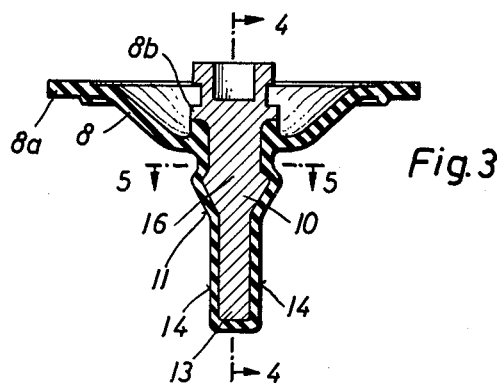
FIG. 3 shows the valve element covered by a diaphragm in a longitudinal cross-section.
Figure 5:
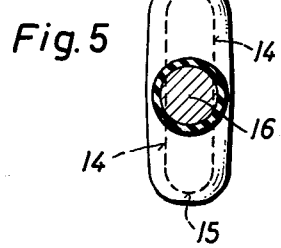
FIG. 5 is a horizontal cross-section on the line 5—5 of FIG. 3.
Figure 4:
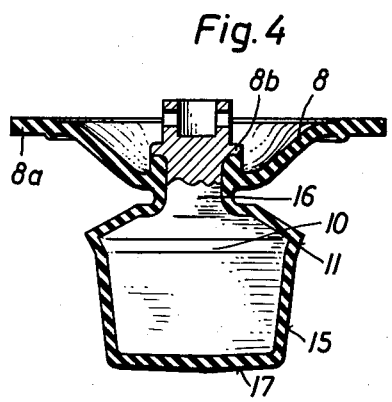
FIG. 4 is a transversal cross-section on the line 4—4 of FIG. 3.
Figure 6:
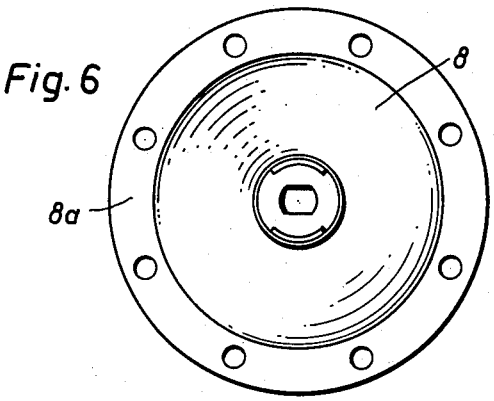
FIG. 6 is a top plan view of the valve element according to FIG. 4.

The slide valve according to the invention consists of the casing 1 and the cover 2 in which is guided the spindle 3 actuated by the hand wheel 4. The casing 1 is provided in known manner with the transition from the circular passage cross-section at the flanges to a rectangular passage cross-section (rectangle 9 with slightly rounded corners) at the place closed by the valve element. The valve element 6 is covered by a diaphragm 7 which may be integral with the disk-like diaphragm 8. The edge 8a of diaphragm 8 is fixed between casing 1 and cover 2.

According to the invention, the valve element shows in different heights two different forms. The part 10 of the valve element lying above the valve seat is shaped like a truncated pyramid whose outer surfaces 11 are obliquely tapered in the closing direction. The sealing surfaces 12 shaped in conformity with these outer surfaces 11 are provided only above the valve seat. Adjacent to this upper part 10 of the valve element is a flat slide-like closing member 13 whose side surfaces 14 and narrow surfaces 15 extend parallel or nearly parallel to the axis of the spindle. The closing member 13 of the valve element forms therefore a regular flat side plate. Above the truncated pyramid-shaped part 10, the valve element is provided with a contracted neck 16 which preferably is circular in horizontal cross-section. The edge 8a of diaphragm 8 and the flanges of casing 1 and cover 2 between which the diaphragm is fixed have likewise circular shape.

The narrow ends 15 of the closing member 13 are slightly tapered in the closing direction. The surfaces 1b of casing 1 are shaped in conformity therewith. The sealing between the valve element covered by a diaphragm and the casing is effected between the tapered outer surfaces 11 of the truncated pyramid-shaped upper part 10 and the corresponding surfaces 12 of the casing, and along the narrow surfaces 15 and the bottom surface 17 of the closing member 13. The bottom surface 17 may be crowned and the narrow surfaces 15 may likewise be crowned slightly so that sealing between the closing member and the opposite wall of the casing is theoretically obtained along a line. It is suitable to provide the valve element with a collar 8b for better supporting the hub of diaphragm 8.

What is claimed is:

A slide valve including a casing provided with a valve seat having a fluid passage therethrough and a valve element having a relatively wide side surface area transverse to the direction of fluid flow through the fluid passage, said valve element having a relatively narrow end surface area and an upper constricted neck portion, a valve spindle secured to said constricted neck portion for moving the valve element upwardly and downwardly in said casing perpendicular to the direction of flow through said passage, an upper valve element portion formed with a large cross-sectional shoulder below said constricted neck portion, the sides and ends of said shoulder tapering sharply downwardly and inwardly in the direction of closing movement of the valve element, a lower valve element portion below said shoulder having substantially parallel flat sides and downwardly and inwardly tapering ends, the ends of said lower portion and the bottom edge thereof being outwardly convexed to provide linear contact with corresponding areas of said valve seat, the convexed ends of said lower portion being spaced apart a distance corresponding to the distance between downwardly and inwardly tapering end surfaces of said casing complementing the downwardly and inwardly tapering ends of said valve element shoulder whereby a minimal gap is produced between said tapering casing end surfaces and said convex ends when said valve element is in the fully opened position thereof, and a flexible diaphragm completely covering said valve element including said constricted neck and having a radial flange extending from said constricted neck and secured at its peripheral edge to said valve casing above said valve seat.

References Cited by the Examiner

UNITED STATES PATENTS 2,670,171   2/54   Holt _____ 251—335.1

FOREIGN PATENTS 507,038   11/51   Belgium.
293,761   1/54   Switzerland.

M. CARY NELSON, *Primary Examiner.*

MARTIN P. SCHWADRON, LAVERNE D. GEIGER,
*Examiners.*